United States Patent
Rajgopal et al.

(10) Patent No.: US 7,924,839 B2
(45) Date of Patent: Apr. 12, 2011

(54) MECHANISM TO REDUCE LOOKUP LATENCY IN A PIPELINED HARDWARE IMPLEMENTATION OF A TRIE-BASED IP LOOKUP ALGORITHM

(75) Inventors: Suresh Rajgopal, San Diego, CA (US); Lun Bin Huang, San Diego, CA (US); Nicholas Julian Richardson, San Diego, CA (US)

(73) Assignee: STMicroelectronics, Inc., Coppell, TX (US)

( * ) Notice: Subject to any disclaimer, the term of this patent is extended or adjusted under 35 U.S.C. 154(b) by 2538 days.

(21) Appl. No.: 10/313,395

(22) Filed: Dec. 6, 2002

(65) Prior Publication Data

US 2004/0111395 A1  Jun. 10, 2004

(51) Int. Cl.
*H04L 12/28* (2006.01)
(52) U.S. Cl. .......................................... 370/392; 370/465
(58) Field of Classification Search .................. 370/389, 370/392, 401, 395.31, 465; 707/3, 7, 104.1
See application file for complete search history.

(56) References Cited

U.S. PATENT DOCUMENTS

| | | | | |
|---|---|---|---|---|
| 5,471,593 | A * | 11/1995 | Branigin ....................... | 712/235 |
| 6,079,006 | A * | 6/2000 | Pickett ........................... | 711/213 |
| 6,209,020 | B1 * | 3/2001 | Angle et al. .................... | 718/108 |
| 6,430,527 | B1 * | 8/2002 | Waters et al. ..................... | 703/3 |
| 6,560,610 | B1 * | 5/2003 | Eatherton et al. ...................... | 1/1 |
| 6,691,124 | B2 * | 2/2004 | Gupta et al. ........................... | 1/1 |
| 6,711,153 | B1 * | 3/2004 | Hebb et al. ...................... | 370/351 |
| 6,728,732 | B1 * | 4/2004 | Eatherton et al. ........... | 707/104.1 |
| 6,731,644 | B1 * | 5/2004 | Epps et al. ...................... | 370/412 |
| 6,772,268 | B1 * | 8/2004 | Kristiansen et al. ........... | 710/308 |
| 6,839,830 | B2 * | 1/2005 | Liu ................................ | 712/200 |
| 6,880,064 | B1 * | 4/2005 | Brown ........................... | 711/216 |
| 6,891,834 | B1 * | 5/2005 | Dally et al. ................ | 370/395.4 |
| 7,099,881 | B2 * | 8/2006 | Richardson et al. ........... | 707/100 |
| 7,171,490 | B2 * | 1/2007 | Basu et al. ...................... | 709/242 |
| 2002/0146009 | A1 | 10/2002 | Gupta et al. | |
| 2002/0147721 | A1 | 10/2002 | Gupta et al. | |
| 2003/0236968 | A1 * | 12/2003 | Basu et al. ...................... | 712/225 |

* cited by examiner

*Primary Examiner* — Ricky Ngo
*Assistant Examiner* — Christine Ng
(74) *Attorney, Agent, or Firm* — Lisa K. Jorgenson; William A. Munck

(57) ABSTRACT

A series of hardware pipeline units each processing a stride during prefix search operations on a multi-bit trie includes, within at least one pipeline unit other than the last pipeline unit, a mechanism for retiring search results from the respective pipeline unit rather than passing the search results through the remaining pipeline units. Early retirement may be triggered by either the absence of subsequent strides to be processed or completion (a miss or end node match) of the search, together with an absence of active search operations in subsequent pipeline units. The early retirement mechanism may be included in those pipeline units corresponding to a last stride for a maximum prefix length shorter than the pipeline (e.g., 20 or 32 bits rather than 64 bits), in pipeline units selected on some other basis, or in every pipeline unit. Worst-case and/or average latency for prefix search operations is reduced.

20 Claims, 3 Drawing Sheets

MECHANISM TO REDUCE LOOKUP LATENCY IN A PIPELINED HARDWARE IMPLEMENTATION OF A TRIE-BASED IP LOOKUP ALGORITHM

TECHNICAL FIELD OF THE INVENTION

The present invention is directed, in general, to multi-bit trie based network search engines and, more specifically, to improving the performance of hardware pipelined multi-bit trie based network search engines.

BACKGROUND OF THE INVENTION

Network routers for packet-based communications protocols such as Internet Protocol (IP) direct incoming information to the next neighbor along a route to the intended destination for the packet. To do this, typically each router along the route must perform route address prefix (normally referred to as just "prefix") lookup operations on a prefix (or routing) table to determine the appropriate next hop address for the destination IP prefix. Such operations are performed by either an embedded network processor or, more commonly, by a separate network search engine.

Originally the hardware for network search engines employed content addressable memory (CAM), a type of memory consisting of a bit comparator and two memory elements, one for storing data and the other storing a compare mask. The CAM compares incoming data with the value stored in the data memory under the control of the mask value, which may be programmed to override the comparison result to "always match" (i.e., "don't care"). In operation, a CAM-based network search engine functions by storing all prefixes of a routing table in a CAM array in a specific, prioritized order, with each prefix's associated next hop information stored in a corresponding (linked) location in another memory. During prefix lookup, a key is placed on the comparand (compare operand) bus of the CAM array and compared against all prefixes in the memory. The array of match results from all comparisons is sent through a priority logic unit to determine the highest priority match, with the winning match used to address the next hop memory from which the corresponding next hop information is read and returned.

More recently, software based network search engines employing a general-purpose processor and a normal memory have been developed. Within such devices, the processor performs prefix searches with a series of memory read and comparison operations. The routing table prefixes and next hop information are typically stored in the memory in data structures built according to one of various software algorithms developed to reduce memory usage in storing the routing table and the number of memory accesses during lookup. For these purposes, a multi-bit trie and the corresponding algorithm are among the data structures and algorithms that achieve the best data compression with a bounded number of memory accesses for search operations.

A trie (from the middle four letters of "retrieve") is a tree-based data structure built to represent binary strings, where each bit or group of bits in the string determines the direction taken among branches within the tree. A binary (unibit or single bit) trie proceeds bit-by-bit and has at most two branches from each node, while a multi-bit consumes multiple bits at a time and has several branches at each node, each branch leading to the next level. The number of bits consumed or examined during branch selection at each node is referred to as a stride. A uniform width stride trie is a trie with all strides having the same width, except possibly the last stride, which may be the remainder of the prefix length after being divided by the stride width.

Generally, the multi-bit trie algorithm works by storing and retrieving prefixes in a uniform stride width trie, grouping all branches in the same level with the same parent (next higher stride level) stride value into a table, referred to as a trie table. At each level, the corresponding stride value provides an index into a trie table entry containing the information needed to get to the next level. A multi-bit trie has the advantage that prefixes with common high order bits (strides) will share the same parent trie tables, reducing the memory required to store the prefixes.

If a prefix of length l is divided into m strides each of n bits, the maximum possible number of entries within the next level trie table is $2^n$. The algorithm encodes all next level stride values from the same parent into a $2^n$ bit data field stored in the entry within the parent trie table, along with a pointer containing the base address of the next level (child) trie table, in a data structure referred to as a trie node. Table compression is achieved by allocating memory for the actual number of table entries that exist, instead of the maximum size $2^n$. For the last stride of each prefix, a similar type of data structure, referred to as an end node, is used, except in this case the pointer points to a table containing next hop information instead of a next level trie table.

Routing table lookup is also performed in same width strides, with the value of the next level stride from the input search key (typically an IP address of 32 or 64 bits) decoded and processed together with the associated data field in the stride value's parent table entry. If a stored route with the same prefix stride value is determined to exist within the trie, an index is calculated using the information in the parent table, then the search continues using the table pointer and the calculated index to form an address leading to the next level trie table entry. If a match is not found, the search terminates without success. If a search reaches an end node and a match is found, the search is successful and the associated next hop information is read from the next hop table.

Successfully completing a lookup in a multi-bit trie requires multiple levels of the trie to be traversed. At each level, the tree node is accessed from memory and used, along with the stride value, to determine the address of the trie node at the next level.

However, latencies within hardware multi-bit trie network search engines can contribute to the overall latencies within the network router, and therefore within the network itself.

There is, therefore, a need in the art for an improved multi-bit trie network search engine.

SUMMARY OF THE INVENTION

To address the above-discussed deficiencies of the prior art, it is a primary object of the present invention to provide, for use in a multi-bit trie network search engine for a network router, a series of hardware pipeline units each processing a stride during prefix search operations on a multi-bit trie and including, within at least one pipeline unit other than the last pipeline unit, a mechanism for retiring search results from the respective pipeline unit rather than passing the search results through the remaining pipeline units. Early retirement may be triggered by either the absence of subsequent strides to be processed or completion (a miss or end node match) of the search at the current stride, together with an absence of active search operations in subsequent pipeline units for systems not supporting out-of-order completion of pipelined search operations. The early retirement mechanism may be included in those pipeline units corresponding to a last stride for a maximum prefix length shorter than the pipeline (e.g., 20 or 32 bit prefixes rather than 64 bit prefixes), in pipeline units selected on some other basis, or in every pipeline unit. Worst-case and/or average latency for prefix search operations is reduced.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4A-4B, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
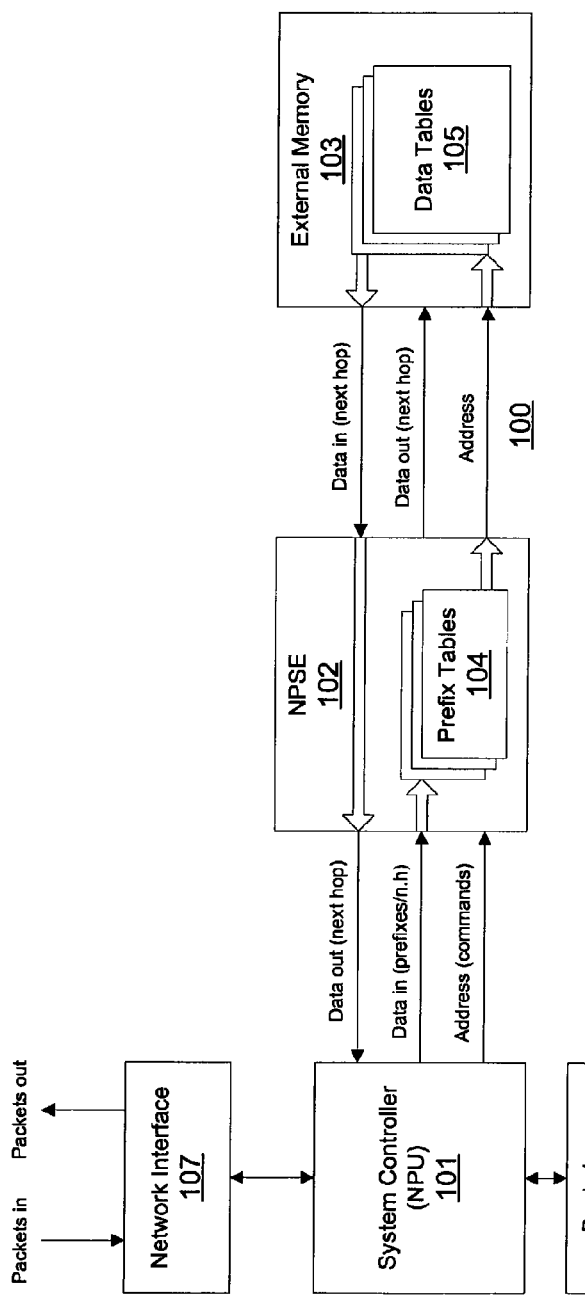
FIG. 1 depicts a processing system utilizing a configurable multi-stage pipeline multi-bit trie network search engine according to one embodiment of the present invention.

FIG. 1 depicts a processing system utilizing a configurable multi-stage pipeline multi-bit trie network search engine according to one embodiment of the present invention. Processing system 100 implements a portion of an Internet Protocol (IP) network router and includes a system controller or network processing unit (NPU) 101 coupled to a network packet search engine (NPSE) 102, which in turn is coupled to external memory 103. NPSE 102 receives addresses and/or commands from system controller 101 as well as prefixes for the next hop address, and returns the next hop address to system controller 101. NPSE 102 transmits data table memory addresses to external memory, together with a data pointer to the next hop address within a data table, determined from prefix tables 104, to external memory 103. NPSE 102 receives from external memory 103 the next hop address from the table and entry within data tables 105 identified by the address and data pointer. System controller 101 is coupled to a backplane 106 and through a network interface 107 to a network.

NPSE 102 is preferably coupled to system controller 101 by a high-speed 32-bit network processor unit (NPU) interface and to external memory 103 by a high-speed 32-bit static random access memory (SRAM) interface. Each interface is implemented by a quad data rate (QDR) architecture, with the system controller 101 as the master for the NPU interface and the external memory 103 as the slave for the SRAM interface, providing 32 bit simultaneous data input/output (I/O) at two words per clock with a maximum clock frequency of 250 mega-Hertz (MHz) for peak aggregate bandwidth of 4.5 gigabytes/second (GB/s). Those skilled in the art will recognize that other configurations of the NPU and SRAM interfaces are possible.

Figure 2:
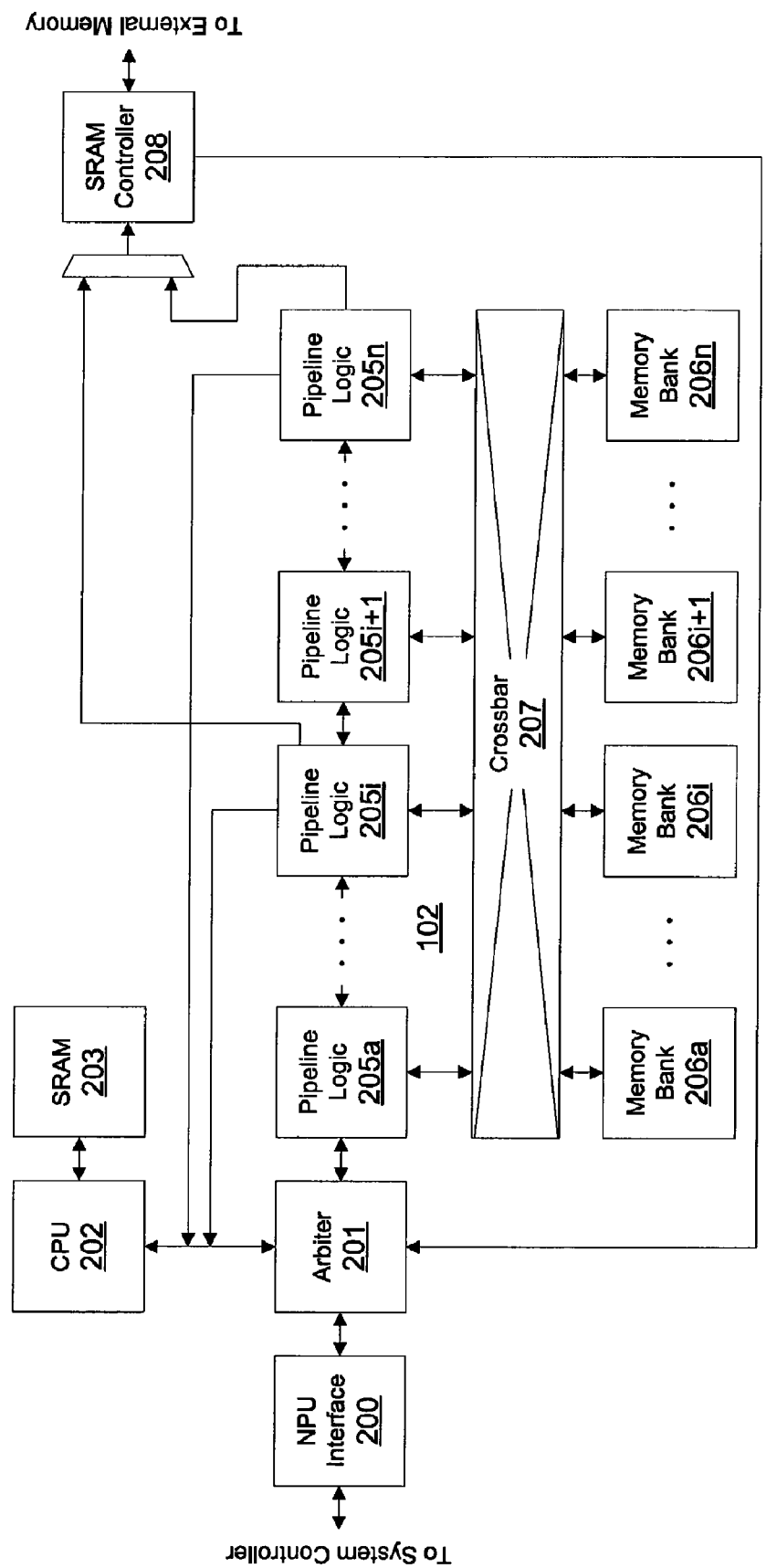
FIG. 2 is a diagram of a microarchitecture for a configurable multi-stage pipelined multi-bit trie network search engine according to one embodiment of the present invention.

FIG. 2 is a diagram of a microarchitecture for a configurable multi-stage pipelined multi-bit trie network search engine according to one embodiment of the present invention. NPSE 102 includes: an NPU interface 200 coupling the NPSE 102 to the system controller 101; an arbiter 201; a central processor unit (CPU) 202 with associated memory (SRAM) 203 containing the programs executed by CPU 202; an SRAM controller 204 coupling the NPSE 102 to the external memory 103; and an array (sixteen in the exemplary embodiment) of pipeline logic units 205a-205n and a corresponding set (also sixteen in the exemplary embodiment) of configurable memory blocks forming a series of virtual memory banks 206a-206n, with pipeline logic units 205a-205n and memory banks 206a-206n coupled by a crossbar 207 enabling the virtual bank configurations. The major tasks performed by NPSE 102 are route insert, delete and search, which expect NPSE 102 to maintain the routing table by inserting routes into and deleting routes from the internal and external memory, and to perform a route search on the prefixes presented and return the associated next hop information.

Figure 3:
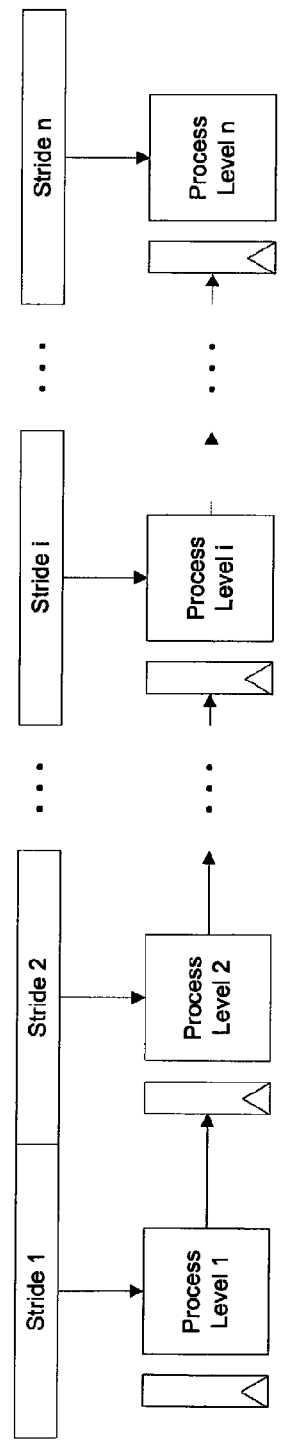
FIG. 3 illustrates hardware pipelining of multi-bit trie searches within a configurable multi-stage pipelined multi-bit trie network search engine according to one embodiment of the present invention.

FIG. 3 illustrates hardware pipelining of multi-bit trie searches within a configurable multi-stage pipelined multi-bit trie network search engine according to one embodiment of the present invention. In a hardware implementation of a multi-bit trie search algorithm, the search through multiple trie levels may be pipelined as shown, with each process level operating on a different stride for a given search key and processing of a new search key initiated each cycle. At any given time, each level of the pipeline is working on a different search key, while processing the stride bits (for that search key) at that level. In one implementation, a miss or an end node match within any of pipeline units other than the last (pipeline unit 205n) produces a result that is passed without further processing through the remainder of the pipeline units.

Most multi-bit trie algorithms are implemented as software programs running on a general-purpose programmable processor. To the extent hardware implementations of multi-bit trie algorithms have been proposed, latencies associated with the search through such a hardware trie are not discussed or addressed.

An importation component of hardware implementation of a multi-bit trie algorithm is the amount of on-chip storage required to store the trie tables. On the one hand, the memory must be large enough to store large routing tables with several hundred thousand prefixes in core routers. At the same time, due to the high throughput lookup requirement of several hundred million searches per second, the access to the memory must be pipelined, which means the memory must be configurable and flexible for simultaneous accessibility in each stage of the pipeline or level of the trie.

One consequence of having a configurable memory structure on-chip is that processing a stride at each trie level takes longer. In the example NPSE 102, there are sixteen pipeline units 205a-205n each processing a 4 bit stride. A 64 bit address prefix for Internet Protocol version 6 (IPv6) packets (typically only 64 bits of the 128 bit prefixes for IPv6 packets are relevant in a search) can be examined at wire speed, but the work done at each level is greater: the configurable on-chip SRAM memory bank 206a-206n needs to be accessed, the trie node entry extracted, and the next trie level address computed. Up to four cycles may be required for these processes in each pipeline unit 205a-205n, resulting in a 64 cycle latency.

Since the same NPSE 102 can accommodate multiple routing tables each with different maximum prefix lengths, e.g., 32 bit prefixes for Internet Protocol version 4 (IPv4) packets or 20 bit prefixes for virtual private network (VPN) packets, the latency of pipeline units 205a-205n imposes an unnecessary restriction on the search completion time for prefixes that are less than 64 bits in length. In addition, the pipelined implementation depicted suffers from the drawback that the entire 64 cycle latency is wasted even when a prefix lookup find the longest prefix match in the first one or two levels, so that average-case lookup latency also suffers.

Figure 4A:
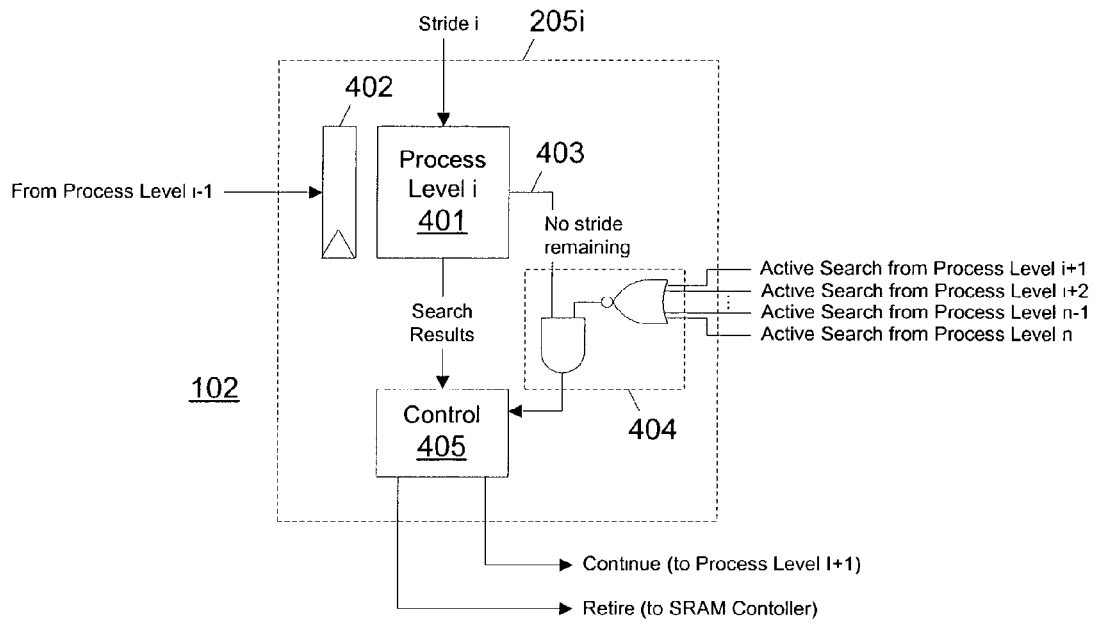
FIGS. 4A-4B depict in greater detail the structure of a pipeline unit for a process level within a configurable multi-stage pipelined multi-bit trie network search engine according to various embodiments of the present invention.
Figure 4B:
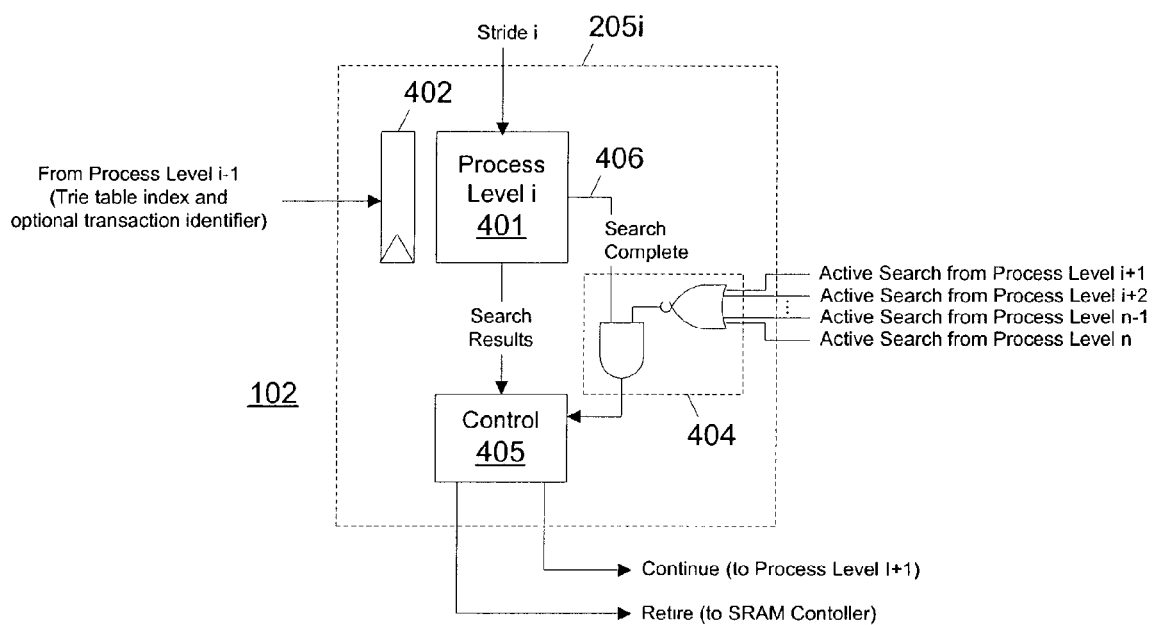

FIGS. 4A and 4B depict in greater detail the structure of a pipeline unit for a process level within a configurable multi-stage pipelined multi-bit trie network search engine according to various embodiments of the present invention. FIG. 4A illustrates the details of a pipeline unit for one embodiment addressing worst-case latency for a given table. Each table that is built and traversed in NPSE 102 is for a specific networking application—that is, IPv4/IPv6, VPN, etc., which means that generally the maximum prefix length l in the table is known.

The maximum prefix length determines the maximum number of trie levels $L_{max}$ for a search with NPSE 102 is $L_{max}$=ceiling(l%4), which in turn determines the worst case latency for searches in that table. Thus, an IPv4 table will have a maximum prefix length of 32 bits and a maximum number of search levels (for 4 bit strides) of eight. In NPSE 102, where each stride level search within a pipeline unit 205a-205n requires four cycles, the worst-case latency for a 32 bit IPv4 search key should be no more than 32 cycles. However, if results of the eighth pipeline unit must be passed through the remaining eight pipeline units as described above, the full 64 cycles will be required.

FIG. 4A illustrates a structure that, assuming all lookups are handled in-order, reduces the worst-case latency from 64 cycles to 32 cycles. Each pipeline unit 205i within the series of pipeline units 205a-205n includes processing logic 401 for the corresponding process level i receiving an input, if any, from the previous process level i−1 through a buffer 402. As a lookup operation proceeds down the pipeline, the number of input bits within the input search key remaining to be processed as strides are consumed at each level is tracked. Within at least one pipeline unit (the eighth pipeline unit in the example of IPv4/IPv6 lookups), a signal 403 is generated indicating when there are no strides remaining. This signal 403 is employed by logic 404 to generate an input to a control unit 405 (e.g., a demultiplexer) determining whether the search result continues through the pipeline (i.e., is passed to the buffer for process level i+1) or is retired.

With the structure of FIG. 4A, when a lookup operation reaches a level where there are no more bits to be processed in the input search key, the operation's results can retire provided there are no active searches further down in the pipeline. For this reason, logic 404 receives active search signals from each subsequent pipeline unit within the series 205a-205n—that is, pipeline units that are physically "ahead" or further along in the pipeline chain, but processing, at a moment of interest, searches earlier in time (issued before the search being processed in the current pipeline unit was issued). However, if NPSE 102 only processes prefixes of a single length that is less than a maximum supported length (i.e., while adapted to handle either IPv4 or IPv6 prefixes, in operation NPSE 102 is employed to handle only IPv4 prefixes), such active search signals are not required.

Signal 403, logic 404 and control unit 405 ensure that the worst-case latency for tables with a 32 bit search key will be 32 cycles instead of 64 cycles, provided there are no active, outstanding lookups in process levels greater than the eighth. On early retirement, a successful lookup is forwarded to the external SRAM 103 with the next hop pointer information, while a failed lookup returns to the NPU 101.

In addition, multiple instances of the structure in FIG. 4A may be implemented within pipeline units 205a-205n. For instance, in addition to being implemented at the eighth pipeline unit to handle IPv4/IPv6 lookups, the structure of FIG. 4A may also be implemented at the fifth pipeline unit to allow early retirement of lookups on 20 bit VPN prefixes in 20 cycles rather than 32 or 64 cycles, again provided that there are no active, outstanding lookups in process levels greater than the fifth if NPSE 102 handles lookups for different length prefixes.

FIG. 4B addresses average-case latency. Even with the structure of FIG. 4A, a 32 bit prefix lookup that completed, either successfully or unsuccessfully, at a process level earlier than the eighth would still retire only after the eighth process level (since strides remain to be processed). However, assuming that all lookups are processed in order, the structure of FIG. 4B enables searches to retire from the pipeline earlier. Rather than a signal dependent on whether there are any further strides remaining to be processed, the processing logic 401 generates a signal 406 indicating whether the search is complete (i.e., either a miss or a match to an end node has been determined).

With the system of FIG. 4B, when a search operation completes successfully or unsuccessfully, a search complete signal 406 is asserted. When signal 406 is asserted and there are no active searches further down in the pipeline, then this particular search can retire from the pipeline regardless of whether there are strides remaining in the prefix to be processed. The search results no longer need be staged through the rest of the pipeline.

The search completion detection system of FIG. 4B may be implemented within every pipeline unit 205a-205n (i.e., at every process level) to allow retirement of each search at the earliest possible point. However, interconnect routing and timing constraints, as well as other practical reasons, may justify using the structure of FIG. 4B only at certain levels or prefix lengths that can benefit the average-case latency. The mechanisms of FIGS. 4A and 4B are not required in the last pipeline unit 205n, although an active search signal from that pipeline unit 205n may be required for preceding pipeline units for process levels i through n−1.

In addition, if an extra level of complexity is added to the pipeline implementation of FIG. 2 and searches are allowed to complete out-of-order in the pipeline with a transaction identifier for every search request, searches may be retired as soon as complete, even when later process levels within the pipeline are still processing lookup requests. Depending on whether the NPU 101 can accept out-of-order search results and the nature of the interface between the NPU 101 and the NPSE 102, a reorder buffer may be used to return search responses in-order, reducing average latency at the cost of increased design complexity.

The present invention reduces the latency of lookup requests in a pipelined multi-bit trie network search engine. NPUs that cannot generate a sufficient number of threads to take full advantage of the long latency in the search engine pipeline often find their input queues on the router line card backed up while waiting for the current threads to complete the associated lookup request. With a reduced worst-case or average-case latency, lookups will complete faster and reduce or avoid such congestion.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A multi-bit trie search engine comprising:
a series of hardware pipeline units each configured to process a stride during prefix search operations on multi-bit trie routing tables,
wherein at least one pipeline unit within the series is configured to determine (a) whether any further strides remain within a prefix for a given prefix search operation past a stride processed by the at least one pipeline unit, and (b) whether any additional prefix search operations are being processed in subsequent pipeline units within the series, wherein the at least one pipeline unit includes a control mechanism configured to enable search results from the at least one pipeline unit for a given prefix search operation either to continue to a next pipeline unit or to be retired based upon whether further strides remain within the prefix for the prefix search operation and whether additional prefix search operations are being processed in subsequent pipeline units.

2. The multi-bit trie search engine according to claim 1, wherein the at least one pipeline unit is configured to determine whether processing within the at least one pipeline unit completes the prefix search operation based upon whether further strides remain within the prefix for the prefix search operation.

3. The multi-bit trie search engine according to claim 1, wherein the at least one pipeline unit is configured to retire search results for the prefix search operation prior to completion of any prefix search operations being processed in subsequent pipeline units.

4. The multi-bit trie search engine according to claim 1, wherein two or more pipeline units within the series each include a control mechanism configured to enable search results from the respective pipeline unit either to continue to the next pipeline unit or to be retired.

5. The multi-bit trie search engine according to claim 4, wherein the two or more pipeline units are located at positions within the series of pipeline units corresponding to a last stride for each of two or more predetermined maximum prefix lengths.

6. The multi-bit trie search engine according to claim 5, wherein one of the two or more pipeline units is located at each of positions within the series of pipeline units corresponding to a last stride for prefixes of 64 bits, for prefixes of 32 bits and for prefixes of 20 bits.

7. A multi-bit trie search engine comprising:
a series of hardware pipeline units each containing:
a buffer configured to receive an index from an input or a preceding pipeline unit; and
logic configured to process a stride during prefix search operations on multi-bit trie routing tables,
wherein at least one pipeline unit within the series is configured to determine (a) whether any further strides remain within a prefix for a given prefix search operation past a stride processed by the at least one pipeline unit, and (b) whether any additional prefix search operations are being processed in subsequent pipeline units within the series, wherein the at least one pipeline unit further comprises:
a demultiplexer configured to transmit search results from the processing logic within the at least one pipeline unit for a given prefix search operation to either a buffer within a subsequent pipeline unit or a controller for accessing next hop information within the routing tables; and
control logic configured to control the demultiplexer to enable search results from the at least one pipeline unit for a given prefix search operation either to continue to a next pipeline unit or to be retired based upon whether further strides remain within the prefix for the prefix search operation and whether additional prefix search operations are being processed in subsequent pipeline units.

8. The multi-bit trie search engine according to claim 7, wherein the control logic within the at least one pipeline unit is configured to determine whether any strides remain within a prefix for the prefix search operation past a stride processed by the at least one pipeline unit.

9. The multi-bit trie search engine according to claim 8, wherein the control logic within the at least one pipeline unit is also configured to determine whether any prefix search operations are being processed in subsequent pipeline units.

10. The multi-bit trie search engine according to claim 7, wherein the control logic within the at least one pipeline unit is configured to determine whether processing within the at least one pipeline unit has produced either a miss or an end node match for the prefix search operation and whether any prefix search operations are being processed in subsequent pipeline units.

11. The multi-bit trie search engine according to claim 7, wherein the control logic within the at least one pipeline unit is configured to retire search results for the prefix search operation prior to completion of any prefix search operations being processed in subsequent pipeline units.

12. The multi-bit trie search engine according to claim 7, wherein two or more pipeline units within the series each further comprise:
   a demultiplexer configured to transmit search results from the processing logic within the at least one pipeline unit for a given prefix search operation to either a buffer within a subsequent pipeline unit or a controller for accessing next hop information within the routing tables; and
   control logic configured to control the demultiplexer to enable search results from the at least one pipeline unit for a given prefix search operation either to continue to a next pipeline unit or to be retired based upon whether further strides remain within the prefix for the prefix search operation and whether additional prefix search operations are being processed in subsequent pipeline units.

13. The multi-bit trie search engine according to claim 12, wherein the two or more pipeline units are located at positions within the series of pipeline units corresponding to a last stride for each of two or more predetermined maximum prefix lengths.

14. The multi-bit trie search engine according to claim 13, wherein one of the two or more pipeline units is located at each of positions within the series of pipeline units corresponding to a last stride for prefixes of 64 bits, for prefixes of 32 bits and for prefixes of 20 bits.

15. A method of operating a multi-bit trie search engine comprising:
   processing a stride within each of a series of hardware pipeline units during prefix search operations on multi-bit trie routing tables; and
   within at least one pipeline unit within the series,
   determining (a) whether any further strides remain within a prefix for a given prefix search operation past a stride processed by the at least one pipeline unit, and (b) whether any additional prefix search operations are being processed in subsequent pipeline units within the series, and
   enabling search results from the at least one pipeline unit for a given prefix search operation either to continue to a next pipeline unit or to be retired based upon whether further strides remain within the prefix for the prefix search operation and whether additional prefix search operations are being processed in subsequent pipeline units.

16. The method according to claim 15, further comprising:
   determining whether processing within the at least one pipeline unit completes the prefix search operation based upon whether further strides remain within the prefix for the prefix search operation.

17. The method according to claim 15, further comprising:
   retiring search results for the prefix search operation prior to completion of any prefix search operations being processed in subsequent pipeline units.

18. The method according to claim 15, further comprising:
   within two or more pipeline units within the series, enabling search results from the respective pipeline unit either to continue to the next pipeline unit or to be retired.

19. The method according to claim 18, wherein the two or more pipeline units are located at positions within the series of pipeline units corresponding to a last stride for each of two or more predetermined maximum prefix lengths.

20. The multi-bit trie search engine according to claim 19, wherein one of the two or more pipeline units is located at each of positions within the series of pipeline units corresponding to a last stride for prefixes of 64 bits, for prefixes of 32 bits and for prefixes of 20 bits.

* * * * *